Jan. 17, 1967  P. G. ANDERSON  3,298,045
COVER FOR OUTDOOR SEATS
Filed Oct. 12, 1964
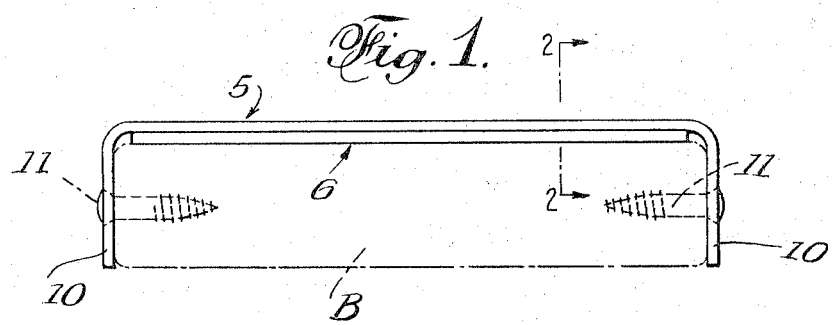
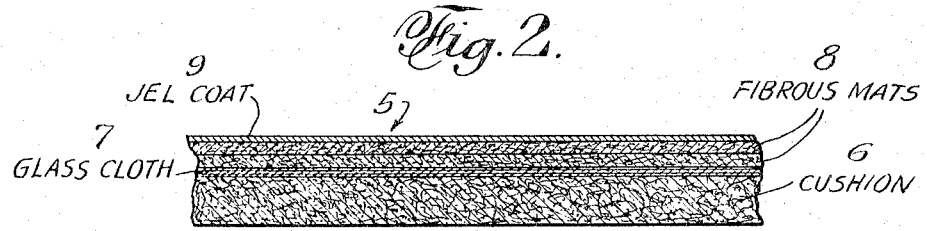
INVENTOR.
PAUL G. ANDERSON
BY C. G. Stratton
ATTORNEY

United States Patent Office 3,298,045
Patented Jan. 17, 1967

3,298,045
COVER FOR OUTDOOR SEATS
Paul G. Anderson, Ontario, Calif., assignor, by direct and mesne assignments, of seventy-five percent to Haak Mfg., Inc., Azusa, Calif., a corporation of California, and twenty-five percent to Byron Curry, Los Angeles, Calif.
Filed Oct. 12, 1964, Ser. No. 403,193
8 Claims. (Cl. 5—345)

This invention relates to covers for outdoor seats, such as bleacher seats, and park and sidewalk benches.

An object of the present invention is to provide a weather proof cover for the intended purpose.

Another object of the invention is to provide a cover for the boards of benches and other outdoor seats that is particularly resistant to moisture and mildew.

A further object of the invention is to provide a cover as above characterized that is comfortable in use in that cushioning resilience is incorporated therein.

This invention also has for its objects to provide such means that are positive in operation, convenient in use, easily installed in a working position and easily disconnected therefrom, economical of manufacture, relatively simple, and of general superiority and serviceability.

The foregoing objects are realized in a cover structure that comprises a lay-up of plastic resin and fiber glass materials hermetically encased in a gel coating and fitted or fastened to the boards of a seat or bench of the character above referred to, with a cushioning layer secured to said lay-up and interposed between the same and the board or boards on which mounted.

The invention also comprises novel details of construction and novel combinations and arrangements of parts, which will more fully apppear in the course of the following description and which is based on the accompanying drawing. However, said drawing merely shows, and the following description merely describes, one embodiment of the present invention, which is given by way of illustration or example only.

FIG. 1 is an end view of a cover for an outdoor seat embodying features of the present invention.

FIG. 2 is an enlarged and fragmentary cross-sectional view as taken on the line 2—2 of FIG. 1.

The cover that is illustrated comprises, generally, a lay-up 5 and a cushion layer 6 applied to the under surface of the lay-up 5. Said cover is shown as applied to a board B which is representative of a bench or bleacher seat or any such outdoor seat. The seat board B may comprise two or more parallel and closely spaced boards, as commonly used in benches and other outdoor seating.

The lay-up 5 may be of indeterminate length up to about fifteen feet, depending on use, and may be end-butted where greater lengths are required. Said lay-up is shown as comprising a lower layer 7 of fiber glass cloth of about 6 oz. weight, two intermediate layers of fiber glass mat 8, each of about 2 oz. weight, and a surface layer or coating 9 of resin gel material to seal over the mats 8, said three fiber glass layers being bonded together with the layer 8 which may comprise a polyester laminating resin, such as any of the phenolic maleic esters or melamine and urea-formaldehyde resins, or any of the alkyd resins used in varnishes, enamels and lacquers. Epoxy resins are especially suitable for their hardness and high resistance to water, solvents, acids, alkalis and other chemicals. Especially useful in this connection is a special lay-up resin, one of a line of 100%-reactive, thermo-setting, unsaturated alkyd resins dissolved in styrene and other monomers. The special lay-up type of this resin is useful in the fabrication of laminated structures and features rapid wetting of fibrous glass, such as contained in layers 7 and 8.

The above-described resin 8 covers all the outer surfaces and edges of the lay-up to cover over the fiber glass cloth, thereby hermetically sealing the laminated lay-up structure above defined.

The cushion 6 may be bonded to the described lay-up 5, preferably to the face having the fiber glass cloth. This cushion advantageously comprises felt or foam rubber carpet underlay of about 32 oz. weight, is narrower than the lay-up structure so that when adhered, as shown, to the mid part of said structure, uncushioned ends 10 on the lay-up are provided. These ends may be bent (by heat and/or pressure application) to form the lay-up into a widened U-form of a size to fit nicely over a seat board B.

A rubber-base cement may be used to bond the cushion 6 to the seat board and, if desired, the lay-up ends 10 may be secured to the board edges by fasteners, such as screws 11.

Color may be imparted to the lay-up by mixing pigment with the laminating resin, thereby producing solid color throughout the lay-up.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A cover for an outdoor board to render the same resistant to moisture and mildew, a cover for the top and edge surfaces of said board, comprising:
    (a) an elongated cushion layer of resilient material centrally disposed on the board and having a width less than that of the board so that the longitudinal edges of the layer are inwardly spaced from the corresponding longitudinal edges of the board,
    (b) an elongated lay-up comprising at least one mat of fibre glass,
    (c) means to bond said mat together comprising a polyester laminating resin selected from the group comprising phenolic maleic esters, melamine and urea-formaldehyde resins, alkyd resins of the type commonly used as ingredient of varnishes, enamels and lacquers, and epoxy resins,
    (d) a surface coating layer of resin gel material covering all the outer surfaces and edges of the lay-up of the same,
    (e) the lay-up having a uniform thickness and a depth at least equal to the thickness of the cushion layer plus at least the thickness of the board, and
    (f) the cushion layer and lay-up being centered with the corresponding longitudinal edges equally spaced on opposite sides, the lateral extensions of the lay-up constituting flexible flanges.

2. The cover according to claim 1, in which fasteners extend through said flanges and are adapted to enter the edges of the board to hold the lay-up over the top and side edges of the board, with the resilient pad between the lay-up and board.

3. The cover according to claim 1, in which the cushion is affixed to the top surface of the board.

4. The cover according to claim 1, in which a layer of woven fibre glass cloth is used under the said fibre glass mat.

5. The cover according to claim 4, in which the woven fibre glass cloth is heavier and more compact than the fibre glass mat.

6. The cover according to claim 4, in which the fibre glass cloth is of 6-ounce weight, and the mat layer is of 2-ounce weight, both weights being approximate.

7. The cover according to claim 6, in which an adhesive bond is provided to connect the cushion to the glass-cloth layer of the lay-up.

8. In a cover for an outdoor board, a weatherproof, reinforced fibre glass lay-up bonded with a resin and formed into a U-shape with an open space between laterally depending sides that inherently retain their downward positions at opposite sides of the open space, in combination with a cushion substantially thinner than said space and disposed up against the under side of the lay-up in the upper portion of said space and between the depending sides, providing a cushioned cover with a space below the cushion that is substantially greater in depth than the thickness of the lay-up and cushion combined, whereby the cushioned cover may be removably placed upon and down at opposite sides of a pre-existing outdoor board.

References Cited by the Examiner
UNITED STATES PATENTS

| | | | |
|---|---|---|---|
| 2,606,598 | 8/1952 | Smith | 297—461 X |
| 2,649,396 | 8/1953 | Witt et al. | 161—93 X |
| 2,840,500 | 6/1958 | Okoomian et al. | 5—355 |
| 3,082,038 | 3/1963 | Sanderson | 297—461 |
| 3,113,788 | 12/1963 | Johnston | 297—461 X |

FRANK B. SHERRY, *Primary Examiner.*

A. M. CALVERT, *Assistant Examiner.*